D. G. Phipps,

Pipe Coupling.

No. 104,348.       Patented June 14, 1870.

Witnesses:
J. H. Shumway
A. J. Tibbits

D. Goffe Phipps
Inventor
By his Attorney,
John E. Earle

United States Patent Office.

D. GOFFE PHIPPS, OF NEW HAVEN, CONNECTICUT, ASSIGNOR TO HIMSELF, MORTIMER M. CAMP, AND ELLSWORTH I. FOOTE, OF SAME PLACE.

Letters Patent No. 104,348, dated June 14, 1870.

IMPROVED JOINT FOR CEMENT PIPES.

The Schedule referred to in these Letters Patent and making part of the same.

To all whom it may concern:

Be it known that I, D. GOFFE PHIPPS, of New Haven, in the county of New Haven and State of Connecticut, have invented a new Improvement in Joint for Cement Pipe; and I do hereby declare the following, when taken in connection with the accompanying drawings and the letters of reference marked thereon, to be a full, clear, and exact description of the same, and which said drawings constitute part of this specification, and represent in—

Figure 1:
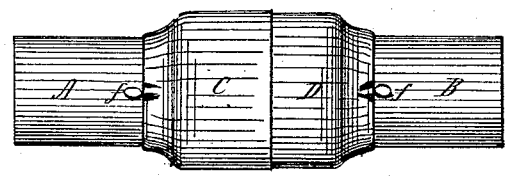
Figure 2:

Figure 1 a side view;

Figure 2 a longitudinal section of the same; and in

Figure 3:
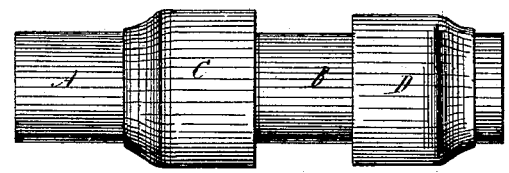

Figure 3, a sectional view, illustrating the operation of forming the joint.

This invention relates to an improvement in the manner of joining cement-lined water-pipes.

Heretofore, this has been done by placing a mass of cement around the meeting ends of the pipe; then, over this, a sheet-iron sleeve is set, and more cement placed over the whole. This joint it is very difficult to make perfect, inasmuch as the cement, if too moist, will permit the sleeve to settle, and, consequently, open the joint, a difficulty which frequently occurs, and to make this joint requires the most experienced workmen.

To overcome these difficulties is the object of my invention, which consists in the construction of the sleeve in two parts, the extreme ends of the two parts being made of the same diameter as the exterior of the pipe, and expanded therefrom toward the meeting ends, so that the extreme ends form a support for the sleeve on the pipe, when the two parts are set together.

A represents one length of pipe, B the other, their two ends set together.

C is one part, and D the other part of the sleeve, the said two parts contracted toward their extreme ends, so as to form a bearing upon the pipe at $a$, and are placed over the pipe previous to laying, as in fig. 3, a short distance from the joint; then the cement placed around the joint in the usual manner, (or the two sleeves may be filled,) and then brought together, so that one sits in the other, as in fig. 2. By this construction the cement is pressed hard around the joint, and the sleeve supported so that by no possibility can it settle.

In order to insure the proper position of the sleeve, I form projections, $f$, on the pipe, as seen in fig. 1, After the sleeve has been thus set, the pipe is treated in the usual manner.

I claim as my invention—

The sleeve for cement pipe-joints, consisting of the two cylinders C D, contracted at their extreme ends so as to bear upon the pipe, and, at their meeting ends, to sit one within the other, so as to close the continuous mass of cement around the meeting ends of the pipe, in the manner and for the purpose specified.

D. GOFFE PHIPPS.

Witnesses:
J. H. SHUMWAY,
A. J. TIBBITS.